(12) United States Patent
Steffens et al.

(10) Patent No.: US 8,999,418 B2
(45) Date of Patent: Apr. 7, 2015

(54) METHODS FOR REDUCING OIL UPTAKE OF FRIED FOODS

(75) Inventors: Matthew S. Steffens, Basking Ridge, NJ (US); Roland Adden, Walsrode (DE); Britta Huebner, Uetze (DE); Xiaodong Zhang, Livingston, NJ (US)

(73) Assignee: Dow Global Technologies LLC, Midland, MI (US)

( * ) Notice: Subject to any disclaimer, the term of this patent is extended or adjusted under 35 U.S.C. 154(b) by 89 days.

(21) Appl. No.: 12/781,853

(22) Filed: May 18, 2010

(65) Prior Publication Data

US 2010/0291272 A1 Nov. 18, 2010

Related U.S. Application Data

(60) Provisional application No. 61/179,037, filed on May 18, 2009.

(51) Int. Cl.
| | | |
|---|---|---|
| *A23F 5/00* | (2006.01) | |
| *A21D 13/06* | (2006.01) | |
| *A21D 10/04* | (2006.01) | |
| *A21D 10/00* | (2006.01) | |
| *A23L 1/00* | (2006.01) | |
| *A23L 1/01* | (2006.01) | |
| *A23L 1/0534* | (2006.01) | |

(52) U.S. Cl.
CPC ............ *A23L 1/005* (2013.01); *A23L 1/0017* (2013.01); *A23L 1/0052* (2013.01); *A23L 1/0107* (2013.01); *A23L 1/0534* (2013.01); *A23V 2002/00* (2013.01)

(58) Field of Classification Search
USPC ........................................... 426/549
See application file for complete search history.

(56) References Cited

U.S. PATENT DOCUMENTS

| | | | |
|---|---|---|---|
| 3,396,034 A | | 8/1968 | Blondheim et al. |
| 4,022,917 A | * | 5/1977 | Selenke ................. 426/331 |
| 5,130,156 A | * | 7/1992 | Bergquist et al. ........... 426/453 |
| 6,001,399 A | | 12/1999 | Kilibwa |
| 6,497,910 B2 | | 12/2002 | Takahashi et al. |
| 2007/0175361 A1 | | 8/2007 | Bonney et al. |

FOREIGN PATENT DOCUMENTS

| | | |
|---|---|---|
| CN | 2007/089834 A2 | 8/2007 |
| DE | 1298960 | 7/1969 |
| JP | A-2001-120207 | 5/2001 |
| JP | A-2006-211928 | 8/2006 |
| WO | WO2005/067720 A1 | 7/2005 |

OTHER PUBLICATIONS

Priya et al.; "Carboxymethylcellulose and Hydroxypropylmethylcellulose as Additives in Reduction of Oil Content in Batter Based Deep-Fat Fried Boondis"; Carbohydrate Polymers; 1996; pp. 333-335; vol. 29; Elsevier Science Ltd.
Saguy "Oil Uptake During Deep-Fat Frying: Factors and Mechanism"; Food Technology, Institute of Food Technologist; 1995; pp. 142-145; vol. 49; No. 4.
Salvador et al.; "Performance of Methyl Cellulose in Coating Batters for Fried Products"; Food Hydrocollids; 2008; vol. 22; pp. 1068-1067; Elsevier Ltd.
Sheng, et al., Research progess of fat uptake in fried foods, College of Food Science, pp. 18-20, 2007. English Abstract only.

* cited by examiner

*Primary Examiner* — D. Lawrence Tarazano
*Assistant Examiner* — Katherine D Leblanc

(57) ABSTRACT

The present application describes methods for reducing oil uptake of fried foods, comprising adding water to a batter mix comprising flour, at least one seasoning, optionally, a leavening agent, and granulated or agglomerated methylcellulose, provided that the methylcellulose has been granulated or agglomerated with a sufficient amount of carboxymethylcellulose as binder, to form a batter; contacting a food with the batter to prepare a battered food; and frying the battered food.

18 Claims, No Drawings

METHODS FOR REDUCING OIL UPTAKE OF FRIED FOODS

CROSS-REFERENCE TO RELATED APPLICATION(S)

This application claims benefit of priority from U.S. Provisional Patent Application No. 61/179,037, filed May 18, 2009, which application is incorporated by reference herein in its entirety.

FIELD

The present application relates to methods for reducing oil uptake of fried foods, particularly battered foods, and novel batter compositions.

BACKGROUND

Among the myriad benefits of cellulose derivatives is the ability to reduce oil uptake of fried foods. However, from a processing viewpoint, this benefit was previously limited by the dry handling and solution forming characteristics of cellulose derivatives. Cellulose derivatives, such as methylcellulose ("MC") and hydroxypropyl methylcellulose ("HPMC") are normally sold in solid, dry form, and hence their powder handling and processing properties are extremely important.

For example, a low dust content is desirable for dry MC and HPMC. The ability of the dry MC or HPMC to be poured from a container or receptacle is described as flowability. Flowability is affected by particle shape and size distribution, and resulting bulk density. Bulk density is the mass of powdered solid material per unit of volume occupied. Acceptable flowability generally depends upon relatively high bulk density and relatively low angle of repose. The angle of repose is the maximum angle between the slope of a conical discharged pile of powder and the surface it rests upon, a lower angle representing a more widely spread pile.

Often, it is desirable to put MC or HPMC in solution as part of using it in its various applications. Dissolution is frequently described as a process with two overlapping phenomena, dispersion and hydration. Dispersion refers to spreading of particles or groups of polymer chains throughout the solution. Hydration refers to loosening of the polymer chains and expansion of their hydrodynamic volume (and corresponding viscosity buildup). If dispersion is poor, or if hydration outpaces dispersion, hydrated polymer can swell and isolate relatively dry, non-hydrated polymer from the solution, forming lumps. It has long been a goal in the industry to produce MC or HPMC which is readily dispersible and hydrates quickly in aqueous solutions, more particularly at room temperature. Desirable dispersion and hydration are normally characterized by little to no lump formation and a rapid viscosity build up over time, respectively.

Thus, what is needed is a process for making an MC and/or HPMC that shows desirable dispersion and hydration, yet exhibits good flowability and low dust content. Such cellulose derivatives surprisingly were found to show better oil reduction efficiency and improved batter uniformity.

SUMMARY

In one embodiment, the present invention provides method for reducing oil uptake of fried foods, comprising adding water to a batter mix comprising flour, at least one seasoning, optionally, a leavening agent, and granulated or agglomerated methylcellulose (or alternatively, hydroxypropyl methylcellulose), provided that the methylcellulose ((or alternatively, hydroxypropyl methylcellulose) has been granulated or agglomerated with a sufficient amount of carboxymethylcellulose as binder, to form a batter, contacting a food with the batter to prepare a battered food, and frying the battered food.

DETAILED DESCRIPTION

In one embodiment, the present invention provides method for reducing oil uptake of fried foods, comprising adding water to a batter mix comprising flour, at least one seasoning, optionally, a leavening agent, and granulated or agglomerated methylcellulose (or alternatively, hydroxypropyl methylcellulose), provided that the methylcellulose ((or alternatively, hydroxypropyl methylcellulose) has been granulated or agglomerated with a sufficient amount of carboxymethylcellulose as binder, to form a batter, contacting a food with the batter to prepare a battered food, and frying the battered food.

In one embodiment, the battered food exhibits at least 5% less oil uptake, preferably at least 7%, and more preferably at least 9%, than battered food prepared with raw, unprocessed methylcellulose (or alternatively, hydroxypropyl methylcellulose).

Methylcellulose is generally available under the tradename METHOCEL A (The Dow Chemical Company). The polymeric backbone of cellulose is a repeating structure of anhydroglucose units. Treatment of cellulosic fibers with caustic solution and methyl chloride, yields cellulose ethers substituted with methoxy groups. The term "DS" refers to the degree of methoxyl substitution per anhydroglucose unit. Methylcellulose typically has a DS of about 1.4 to about 3.0, preferably about 1.5 to about 2.2, more preferably about 1.8.

In one embodiment, the methylcellulose has a viscosity at 2% concentration in water at 20° C., of about 1 cps to about 100,000 cps, preferably about 5 cps to about 4000 cps. In one embodiment, the viscosity is about 4000 cps, in another embodiment, the viscosity is about 15 cps.

In one alternative embodiment of the present invention, methylcellulose is replaced by hydroxypropyl methylcellulose. Hydroxypropyl methylcellulose is generally available under the tradename METHOCEL E, F, J, and K (The Dow Chemical Company). The polymeric backbone of cellulose is a repeating structure of anhydroglucose units. Treatment of cellulosic fibers with caustic solution and methyl chloride and propylene oxide, yields cellulose ethers substituted with methoxy groups and hydroxypropyl groups. The term "DS" refers to the degree of methoxyl substitution per anhydroglucose unit. The term "MS" refers to the degree of hydroxypropoxyl substitution per anhydroglucose unit. Each grade is differentiated by the methoxy and hydroxypropyl substitution on the polymeric backbone. Hydroxypropyl methylcellulose useful in the present invention has a DS of less than 2.0, preferably, the DS is about 1.8 or about 1.4, and an MS in a range of about 0.05 to about 1.2, preferably about 0.1 to about 0.5.

In contrast to unprocessed, raw material, the term "granulated or agglomerated" refers to methylcellulose (or alternatively hydroxypropyl methylcellulose) that has been treated, as will be described, to exhibit improved dispersibility in aqueous solutions.

For simplicity of drafting, only the methylcellulose embodiment is described in detail. In one embodiment, the methylcellulose is granulated. US Patent Publication 2007/0175361, the entirety of which is incorporated herein by reference, teaches a process of making cold-water dispersible cellulose ethers by introducing a particulate, water-soluble polymer and an aqueous solution comprising a surface treatment additive into a high shear mixing chamber prior to being introduced into a pneumatic drying means, for example, in a fluid bed agglomerator, and maintaining the particulate, water-soluble polymer suspended in a gas carrier within a chamber of the pneumatic drying means, maintaining the gas carrier at a temperature below the temperature at which the water soluble polymer particles degrade or become "sticky" and agglomerate to leave residual, dried surface treatment additive coated on the particulate, water-soluble polymer in an amount sufficient to produce the cold water dispersible water-soluble polymer. This makes methylcellulose more dispersible in aqueous solutions at room temperature and improves hydration, however, this has the deleterious effect of lowering the bulk density and increasing the angle of repose, which in turn decreases flowability.

Typically, those skilled in the art seek to minimize agglomeration and encourage granulation as discussed above. It has now been surprisingly found that the present process can achieve excellent results by proceeding contrary to the conventional wisdom.

Accordingly, in the preferred embodiment, the methylcellulose is agglomerated. In this process for producing an aqueous dispersible methylcellulose, unprocessed, raw methylcellulose is introduced into a high shear mixer, at least 20 percent water by weight with an additional about 0.5 to about 3 weight percent, preferably 2.5 weight percent, of carboxymethyl cellulose (CMC) is added to the methylcellulose (preferably, the CMC is in solution with the water), forming methylcellulose agglomerates, and the agglomerates are dried by non-contact drying means to form the aqueous dispersible methylcellulose. In one embodiment, after drying, the aqueous dispersible methylcellulose has about 0.25 to about 2.0 weight percent CMC, and preferably less than 1 weight percent CMC. The term "aqueous dispersible methylcellulose" refers to a methylcellulose which exhibits improved dispersibility in aqueous solutions. In a preferred embodiment, the introduction step is in a continuous process, but the process may be carried out in a batch or semi-batch process in alternative embodiments.

Some methylcellulose features, like degree of substitution, remain constant throughout the process. Physical features of methylcellulose, however, will be changed by the currently described process. Raw material methylcellulose has a bulk density of about 150 g/L to about 350 g/L, preferably about 220 to about 240 g/L, and an angle of repose of about 47.8° to about 48.8°, and thus has good flowability, however, raw material methylcellulose is not generally considered dispersible in aqueous solutions at room temperature and is very slow to hydrate. Raw material methylcellulose also retains a large percentage of dust, i.e., over 50% particles with particle size of 63 micron or less.

Contemplated high shear mixers include ring layer mixers, Ploughshare mixers, Schugi mixers, and Turbulizer mixers. In a preferred embodiment, the high shear mixer is a ring layer mixer. A ring layer mixer generally comprises a horizontal drum with a mixing shaft axially disposed in it. The mixing shaft has blades, bolts, and/or paddles protruding from it. Mixing shaft geometry can create various mixing zones for transporting, dispersing, mixing, and the like. The product to be mixed forms a concentric ring via centrifugal force, and moves through the mixer in plug-like flow. Liquid is added through a hollow shaft or by injection through special perforated mixing tools. The residence time varies with rpms, flow rate, amount of material, drum length, and selected mixing shaft geometry. A suitable ring layer mixer can be procured from Loedige (Paderborn, Germany), under the tradename CORIMIX CM 20. In an alternative embodiment of the present invention, the high shear mixers can be replaced by a flow jet mixer.

In one embodiment, the process step of adding at least 20 percent water by weight to the methylcellulose with an additional about 0.5 to about 3 weight percent of carboxymethyl cellulose (CMC) to form a carboxymethylcellulose solution, can be modified to include adding, at least 25, or at least 30, or, if conditions are selected to discourage granulation, at least 35 percent carboxymethylcellulose solution by weight to the methylcellulose. It has now been surprisingly found that the present process can achieve excellent results without additional surface treatment additives, for example, salts, sugars, surfactants, and/or glycols.

In one embodiment, the process further comprises adjusting the residence time in the ring layer mixer, for example, rpms and mixing shaft geometry, to encourage agglomeration of the methylcellulose. In one embodiment, the process further comprises adjusting the spray rate and residence time in the ring layer mixer to discourage granulation of the methylcellulose.

The step of drying the agglomerates by non-contact drying means, in one embodiment, includes those where the non-contact drying means is a fluid bed dryer. In one embodiment, the present invention provides a further step, comprising drying the methylcellulose at a temperature of more than about 50° C., preferably about 70° C. Alternatively, the methylcellulose is dried to a residual water content of less than about 10% by weight, irrespective of temperature.

In one embodiment, the aqueous dispersible methylcellulose disperses well with minimal lumps visible. In one embodiment, the aqueous dispersible methylcellulose hydrates relatively quickly, as evidenced by times to 90% viscosity (the time in min where the given % of the final torque was obtained) of less than 6 minutes. As can be appreciated, higher viscosity methylcelluloses may hydrate slower than this while still showing good performance in applications.

In one embodiment, the aqueous dispersible methylcellulose has a bulk density that is at least 90% of the raw material MC's bulk density, preferably at least 92%, preferably at least 93%, and most preferably at least 94%.

In one embodiment, the aqueous dispersible methylcellulose has an angle of repose that is only 5% greater than, and preferably substantially the same as, or more preferably, less than the raw material MC's angle of repose.

In one embodiment, the aqueous dispersible methylcellulose has significantly reduced dust as compared to the raw material, preferably containing less than 30% particles with less than a 64 micron particle size, more preferably less than 25%, and most preferably, less than 22%.

It is understood that HPMC may be treated as described above, and shows similar improvements. Raw material HPMC has a bulk density of about 200 g/L to about 600 g/L.

The aqueous dispersible methylcellulose finds use in foods. In one embodiment, the present invention provides a dry batter mix, comprising flour, at least one seasoning, an optional leavening agent, and granulated or agglomerated methylcellulose, provided that the methylcellulose has been granulated or agglomerated with a sufficient amount of carboxymethylcellulose as binder. It is understood that use of carboxymethylcellulose as binder refers to treatment of the methylcellulose (or HPMC) with a solution containing carboxymethylcellulose as described above.

In one embodiment, the methylcellulose is agglomerated and has a time to 90% viscosity of 20 minutes or less, preferably 10 minutes or less, more preferably 6 minutes or less.

Preferably, the flour is at least one of wheat flour, corn flour, rice flour, potato flour, tapioca flour, soy flour, oat flour, or barley flour. In one embodiment, the flour is a mixture of at least two of wheat flour, corn flour, rice flour, potato flour, tapioca flour, soy flour, oat flour, or barley flour, more preferably the flour is an approximately 1:1 mixture of wheat flour and corn flour. In an alternative embodiment, the flour is at least one of a potato, rice, or tapioca flour.

Preferably, the seasonings are selected from the group consisting of salt, pepper, garlic, onion, cumin, paprika, herbs, allspice, annatto, basil, cilantro, coriander, cumin, chili, dill, horseradish, mace, mustard, paprika, parsley, rosemary, sage, sesame, tarragon, thyme, tumeric, and wasabi.

In one embodiment, the optional leavening agent is baking powder.

In some embodiments, the batter further comprises at least one of cornmeal, powdered milk, or powdered egg.

The amount of ingredients in the dry batter mix is readily determined by those skilled in the art. In one embodiment, the amount of carboxymethylcellulose in the dry batter is about 0.02 weight percent, while the amount of methylcellulose is about 2 weight percent.

The present invention also relates to a method for preparing battered foods, comprising adding water to the batter mix described above to form a batter; and contacting a food with the batter to prepare a battered food.

Foods that are battered include vegetable products (including tofu, potatoes, onions, okra, broccoli, zucchini, carrot, eggplant, and cauliflower), meat products (including hot dogs and chicken), fish products (including fish filets, processed fish sticks, and shrimp), dairy products (including cheese), fruit products (including plantains), confectionary products, and combinations thereof, (including products like Monte Cristo sandwiches).

In one embodiment, the method further comprises freezing the battered food. In one embodiment, the method further comprises baking or deep frying the battered food.

EXAMPLES

The following examples are for illustrative purposes only and are not intended to limit the scope of the present invention.

Example 1

Ring Layer Mixer

Exemplary aqueous dispersible methylcellulose and hydroxypropyl methylcellulose according to the present invention are created as follows. The starting material (raw MC or HPMC) is fed continuously in the ring-layer mixer (CORIMIX CM 20) running at a flow rate of approximately 3000 rpm. Alternatively, acceptable residence time can be achieved by adjusting tip speed or Froude number. Water is sprayed in the mixer on the product. Older systems use injection of the water through the jacket, whereas newer systems spray through the fast rotating axle. Sufficient water is added so that the wetted agglomerate leaving the mixer has a moisture content of approximately 25-30%. The obtained agglomerate is subsequently dried in a fluid bed dryer (Huettlin Mycrolab) at an air inlet temperature of 50-120° C., preferably 70° C., until the product has reached a temperature of approximately 52-53° C. A summary of conditions is recited in TABLE 1.

TABLE 1

| | 2.5% CMC in Water Solution | RLM rpm | RLM CE flow (kg/h) | Drying Temp (° C.) |
|---|---|---|---|---|
| Batch 1 (15 cps MC) | 30% | 3000 | 150 | 75 |
| Batch 2 (4000 cps MC) | 30% | 3000 | 150 | 75 |
| Batch 3 (50 cps HPMC; DS ~1.8) | 30% | 3000 | 150 | 70 |
| Batch 4 (4000 cps HPMC; DS ~1.8) | 30% | 3000 | 150 | 70 |
| Batch 5 (4000 cps HPMC; DS ~1.4) | 30% | 3000 | 150 | 75 |

Example 2

Fluid Bed

Exemplary aqueous dispersible methylcellulose and hydroxypropyl methylcellulose according to an alternative process of the present invention are created as follows. The starting material is made in a batch process in the fluid bed processor. After conventionally fluidizing the material, water is top sprayed through a nozzle on the fluidized material. The air inlet temperature is held constant at approximately 50° C. during spraying while the product temperature is approximately 35° C. The addition of water is stopped when the ratio of added water/(sum of added water and MC or HPMC) is 0.25 or 0.3.

The obtained agglomerate is subsequently dried in a fluid bed dryer (Huettlin Mycrolab) at an air inlet temperature of 70° C. until the product has reached a temperature of approx. 52-54° C. A summary of conditions is recited in TABLE 2.

TABLE 2

| | 2.5% CMC in Water Solution (%) | FBA air inlet (° C.) | FBA product (° C.) | Drying Temp (° C.) |
|---|---|---|---|---|
| Batch 6 (15 cps MC) | 30 | 50 | 32 | 75 |
| Batch 7 (4000 cps MC) | 30 | 50 | 31 | 75 |
| Batch 8 (50 cps HPMC; DS ~1.8) | 30 | 50 | 31 | 70 |
| Batch 9 (4000 cps HPMC; DS ~1.8) | 30 | 50 | 31 | 70 |
| Batch 10 (4000 cps HPMC; DS ~1.4) | 30 | 50 | 32 | 75 |

Example 3

Batches 1-10 were created substantially according to the protocols of Examples 1 and 2, and are characterized with the results being recited in TABLE 3.

TABLE 3

| | Bulk density (g/L) | Dust (% ≤63 μm) | Angle of repose (°) | Dispersibility | Powder Flow (g/min) | Time to 90% visc. (min) |
|---|---|---|---|---|---|---|
| Batch 1 | 226.5 | 20.21 | 47.57 | good | 24 | 4.5 |
| Batch 2 | 213.8 | 24.3 | 49.02 | acceptable | 24 | 17 |
| Batch 3 | 368.6 | 5.71 | 38.50 | good | 189 | 3.5 |
| Batch 4 | 309.7 | 29.48 | 45.80 | acceptable | 36 | 19 |
| Batch 5 | 328.8 | 10.86 | 42.2 | acceptable | 208 | 13 |
| Batch 6 | 116.8 | 12.42 | 52.57 | good | 19 | 4.2 |
| Batch 7 | 85.6 | 6.36 | 50.23 | acceptable | 7 | 5 |
| Batch 8 | 340.3 | 2.72 | 37.73 | good | 241 | 3 |
| Batch 9 | 167.1 | 17.16 | 53.50 | good | 26 | 7 |
| Batch 10 | 205.7 | 6.64 | 45.17 | acceptable | 96 | 13 |

The differences regarding the dispersibility are due to the MC or HPMC viscosity (higher molecular weights tend to disperse somewhat slower). Also, Batches 2 and 7, and Batch 5 and 10, represent grades that show thermodynamically a slower dispersion at 20° C.

The bulk density is determined by weighing a completely filled beaker of known volume. Values given are average values of three measurements. The dust content is the fraction smaller than 63 μm after sieving the product accordingly.

The angle of repose is determined with a Hosokawa Micron Powder Characteristics Tester (model PT-R, 1999, software version 1.02) at a vibration adjustment of ~2.5.

The powder flow speed is measured with the same instrument, using the same method and the same vibration adjustment, as flow by weight through the system for 20 seconds. After the flow becomes consistent, three measurements are combined and averaged.

The dispersibility is tested in a beaker, 0.5 g of the final product is dispersed in a beaker containing 49.5 g water (yielding a 1 weight % solution) stiffing at 500-750 rpm. Directly after dispersion, a visual assessment is made by a trained technician to determine the quality of the solution, whether lumps can be seen, and how well the sample is distributed throughout the entire solution. The viscosity build up is measured by analyzing the torque over the time (using a Haake VT 550 viscometer) at 600 rpm for 30 min. The torque data of the last 5 min of the measurement were averaged and defined as final torque level. 90% viscosity build up was defined as the time in min where 90% of the final torque was obtained.

Example 4 (Comparative)

The raw material (without processing) was tested substantially according to the protocols of Example 3 and the results are recited in TABLE 4.

TABLE 4
(Comparative)

| | Bulk density (g/L) | Dust (% ≤63 μm) | Angle of repose (°) | Dispersibility | Time to 90% visc. |
|---|---|---|---|---|---|
| Batch A 15 cps MC | 239.2 | 59.51 | 47.8 | Not dispersible | >30 |
| Batch B 4000 cps MC | 225.1 | 55.94 | 48.83 | Not dispersible | >30 |
| Batch C 50 cps HPMC; DS ~1.8 | 411.6 | 47.43 | 41.6 | Not dispersible | >30 |
| Batch D 4000 cps HPMC; DS ~1.8 | 328 | 69.48 | 47.3 | Not dispersible | >30 |
| Batch E 4000 cps HPMC; DS ~1.4 | 341.2 | 49.95 | 45.07 | Not dispersible | >30 |

As can be seen, the dispersibility and time to viscosity results are undesirable.

Example 5

Exemplary dry batter mix incorporating aqueous dispersible methylcellulose and/or hydroxypropyl methylcellulose according to the present invention has the ingredients listed in TABLE 5.

TABLE 5

| | Wt. % |
|---|---|
| Wheat Flour | 46.84 |
| Corn Flour | 46.84 |
| Salt | 2.87 |
| Baking Powder | 1.43 |
| Batch 1 | 2.01 |

Within the broad spirit of the disclosure, the wheat flour may be bleached or unbleached, and may be present from about 35% to about 50%. The corn flour may be present from about 35% to about 50%. The salt may be present from about 1% to about 5%. The leavening agent may be present from about 1% to about 5%. The aqueous dispersible methylcellulose and/or hydroxypropyl methylcellulose may be present from about 1% to about 5%.

Example 6

An inventive fried food is prepared by mixing a dry batter substantially according to Example 5, hydrating the dry batter by adding cold water in a 1:3 dry batter:water ratio, dipping the food in the hydrated batter, and deep frying the food.

A control fried food is prepared by mixing a dry batter replacing the aqueous dispersible methylcellulose in Example 5 with the same amount of raw material methylcellulose, hydrating the resulting dry batter by adding cold water in a 1:3 control dry batter:water ratio, dipping the food in the hydrated control batter, and deep frying the food.

French fries were battered and fried with the above batters and their total fat (%) was analyzed by Silliker Labs using the MOJO Acid Hydrolysis Method (AOAC 933.05). The control batter coated fry had a total fat content of 12.33%, whereas the inventive batter coated fry had a total fat content of 11.17%. Accordingly, the inventive batter coated fry had a reduced oil uptake of 9.4% ((12.33−11.17)/12.33*100), which is surprising.

Moreover, it was noted by a panel of five trained observers that the inventive batter performed dramatically better than the control batter, receiving a 4 out of a possible 5 for ease of dispersion, smoothness of batter, and absence of lumping, whereas the control batter scored 2 out of 5 for the same characteristics.

Example 7

An inventive fried food is prepared by mixing a dry batter comprising 97.07 weight percent potato flour and 2.93 weight percent salt, mixing in 6 g of Batch 1, hydrating 69 g of the mixture by adding 225 g of cold water, dipping the food in the hydrated batter, and deep frying the food.

A control fried food is prepared by mixing the dry batter as above, but replacing Batch 1 with 6 g of Batch A (Example 4; raw material methylcellulose).

French fries were battered and fried with the above batters and their total fat (%) was analyzed by Silliker Labs using the MOJO Acid Hydrolysis Method (AOAC 933.05). The control batter coated fry had a total fat content of 9.79%, whereas the inventive batter coated fry had a total fat content of 8.8%. Accordingly, the inventive batter coated fry had a reduced oil uptake of 10.1% ((9.79−8.8)/9.79*100), which is surprising. The batter was aesthetically pleasing and coated well.

It is understood that the present invention is not limited to the embodiments specifically disclosed and exemplified herein. Various modifications of the invention will be apparent to those skilled in the art. Such changes and modifications may be made without departing from the scope of the appended claims.

Moreover, each recited range includes all combinations and subcombinations of ranges, as well as specific numerals contained therein. Additionally, the disclosures of each patent, patent application, and publication cited or described in this document are hereby incorporated herein by reference, in their entireties.

The invention claimed is:

1. A dry batter mix, comprising:
    flour;
    at least one seasoning;
    optionally, a leavening agent; and
    from about 1% to about 5% by weight, based on dry batter mix, of an agglomerated aqueous dispersible methylcellulose or hydroxypropyl methylcellulose, with the proviso that the methylcellulose or hydroxypropyl methylcellulose has, prior to incorporation in the dry batter mix, been agglomerated with 0.25 weight percent to 2.0 weight percent carboxymethylcellulose as binder, the carboxymethylcellulose percent based on the weight of methylcellulose or hydroxypropylmethylcellulose.

2. The batter mix of claim 1, wherein the methylcellulose or hydroxypropyl methylcellulose has a time to 90% viscosity of 10 minutes or less.

3. The batter mix of claim 1, wherein the flour is at least one of wheat flour, corn flour, rice flour, potato flour, tapioca flour, soy flour, oat flour, or barley flour.

4. The batter mix of claim 1, wherein the seasonings are selected from the group consisting of salt, pepper, garlic, onion, cumin, paprika, herbs, allspice, annatto, basil, cilantro, coriander, cumin, chili, dill, horseradish, mace, mustard, paprika, parsley, rosemary, sage, sesame, tarragon, thyme, tumeric, and wasabi.

5. The batter mix of claim 1, wherein the leavening agent is baking powder.

6. The batter mix of claim 1, further comprising at least one of cornmeal, powdered milk, or powdered egg.

7. A method for reducing oil uptake of fried foods, comprising:
    adding water to the batter mix of claim 1 to form a batter;
    contacting a food with the batter to prepare a battered food; and
    frying the battered food,
    wherein the battered food exhibits at least 5% less oil uptake.

8. A method for preparing battered foods, comprising:
    adding water to the batter mix of claim 1 to form a batter; and
    contacting a food with the batter to prepare a battered food.

9. The method of claim 7, further comprising freezing the battered food.

10. The method of claim 7, further comprising baking or deep frying the battered food.

11. The batter mix of claim 1 comprising from about 1% to about 5% by weight of the agglomerated aqueous dispersible methylcellulose.

12. The batter mix of claim 11 which comprises from about 1% to about 5% by weight of seasoning and optionally from about 1% to about 5% leavening, and wherein the agglomerated aqueous dispersible methylcellulose has a DS of about 1.4 to about 3.

13. The batter mix of claim 12 wherein the agglomerated aqueous dispersible methylcellulose has a bulk density that is at least 90% of the raw material methylcellulose's bulk density.

14. The batter mix of claim 1 wherein the agglomerated aqueous dispersible methylcellulose or hydroxypropyl methylcellulose contains hydroxypropyl methylcellulose having a DS less than 2.0 and an MS of about 0.05 to about 1.2.

15. The method of claim 7 wherein the batter mix comprises from about 1% to about 5% by weight of the agglomerated aqueous dispersible methylcellulose.

16. The method of claim 15 wherein the batter mix comprises from about 1% to about 5% by weight of seasoning and optionally from about 1% to about 5% leavening and wherein the agglomerated aqueous dispersible methylcellulose has a DS of about 1.4 to about 3.

17. The method of claim 8 wherein the batter mix comprises from about 1% to about 5% by weight of the agglomerated aqueous dispersible methylcellulose.

18. The method of claim 17 wherein the batter mix comprises from about 1% to about 5% by weight of seasoning and optionally from about 1% to about 5% leavening and wherein the methylcellulose has a DS of about 1.4 to about 3.

* * * * *